United States Patent
Rohrer et al.

(10) Patent No.: US 8,667,254 B1
(45) Date of Patent: Mar. 4, 2014

(54) METHOD AND APPARATUS FOR PROCESSING DATA IN AN EMBEDDED SYSTEM

(75) Inventors: Carl F. Rohrer, Longmont, CO (US); Patrick J. Smith, Boulder, CO (US); Stacey Secatch, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 861 days.

(21) Appl. No.: 12/121,614

(22) Filed: May 15, 2008

(51) Int. Cl.
*G06F 15/163* (2006.01)
*G06F 15/80* (2006.01)

(52) U.S. Cl.
USPC .............. 712/33; 712/34; 712/225; 710/52; 710/53

(58) Field of Classification Search
USPC .............................. 712/34, 33, 225
See application file for complete search history.

(56) References Cited

U.S. PATENT DOCUMENTS

| | | | | |
|---|---|---|---|---|
| 4,135,059 A * | 1/1979 | Schmidt | | 370/324 |
| 4,727,538 A * | 2/1988 | Furchtgott et al. | | 370/431 |
| 4,750,110 A * | 6/1988 | Mothersole et al. | | 710/110 |
| 5,109,333 A * | 4/1992 | Kubota et al. | | 712/34 |
| 5,220,651 A * | 6/1993 | Larson | | 710/8 |
| 5,444,707 A * | 8/1995 | Cerna et al. | | 370/389 |
| 5,485,624 A * | 1/1996 | Steinmetz et al. | | 712/34 |
| 5,745,732 A * | 4/1998 | Cherukuri et al. | | 711/168 |
| 6,002,881 A * | 12/1999 | York et al. | | 712/34 |
| 6,067,408 A * | 5/2000 | Runaldue et al. | | 710/307 |
| 6,195,334 B1 * | 2/2001 | Kadambi et al. | | 370/236 |
| 6,260,073 B1 * | 7/2001 | Walker et al. | | 709/249 |
| 6,363,444 B1 * | 3/2002 | Platko et al. | | 710/110 |
| 6,539,500 B1 * | 3/2003 | Kahle et al. | | 714/45 |
| 6,611,537 B1 * | 8/2003 | Edens et al. | | 370/503 |
| 6,721,872 B1 * | 4/2004 | Dunlop et al. | | 712/28 |
| 6,981,070 B1 * | 12/2005 | Luk et al. | | 710/5 |
| 7,032,031 B2 * | 4/2006 | Jungck et al. | | 709/246 |
| 7,080,215 B2 * | 7/2006 | Ueno | | 711/147 |
| 7,356,680 B2 * | 4/2008 | Svensson et al. | | 713/1 |
| 7,668,762 B2 * | 2/2010 | Jain et al. | | 705/29 |
| 2003/0204682 A1 * | 10/2003 | Ueno | | 711/147 |
| 2004/0121748 A1 * | 6/2004 | Glaza | | 455/151.1 |
| 2006/0129728 A1 * | 6/2006 | Hampel | | 710/118 |
| 2006/0168435 A1 * | 7/2006 | Svensson et al. | | 713/1 |
| 2007/0174372 A1 * | 7/2007 | Feghali et al. | | 708/200 |
| 2007/0192547 A1 * | 8/2007 | Feghali et al. | | 711/154 |
| 2007/0192571 A1 * | 8/2007 | Feghali et al. | | 712/220 |
| 2007/0192626 A1 * | 8/2007 | Feghali et al. | | 713/189 |

FOREIGN PATENT DOCUMENTS

| | | | | | |
|---|---|---|---|---|---|
| GB | 2248128 A | * | 3/1992 | | G06F 13/12 |
| JP | 03081851 A | * | 4/1991 | | G06F 13/00 |

* cited by examiner

*Primary Examiner* — Aimee Li
(74) *Attorney, Agent, or Firm* — Kin-Wah Tong; LeRoy D. Maunu

(57) ABSTRACT

In one embodiment, a network device is disclosed. For example, in one embodiment of the present invention, the device comprises a processor and a core memory having a receive buffer and a transmit buffer. The device comprises a bus coupled to the processor and the core memory. The device comprises at least one co-processor coupled to the core memory via a direct link, wherein the at least one co-processor is capable of accessing at least one of: the receive buffer, or the transmit buffer, without assistance from the processor.

18 Claims, 7 Drawing Sheets

METHOD AND APPARATUS FOR PROCESSING DATA IN AN EMBEDDED SYSTEM

FIELD OF THE INVENTION

One or more aspects of the present invention relate generally to the use of one or more co-processors with direct links to a core having one or more buffers in an embedded system.

BACKGROUND OF THE INVENTION

Various networking protocols allow a plurality of network devices to communicate over a network, e.g., a ring network. For example, Media Oriented Systems Transport (MOST) is an automotive infotainment protocol where bytes of synchronous data such as audio and video are transported in time-divisioned multiplexed frames around a ring network. The protocol is specified up to the application layer, which implies a compliant network services stack running in software. Thus, a Network Interface Controller (NIC) will allow compliancy at the application level while providing connectivity at the physical layer, e.g., an optical ring.

Generally, within each network device, an interface, e.g., a shared bus, is employed to allow communications between various embedded cores. For example, an embedded core may be tasked with an encryption function, a decryption function and the like. However, movement of data to and from such embedded cores to a centralized memory core is computational expensive given that a processor of the NIC is already tasked with supporting various network services. Although a Direct Memory Access (DMA) module can be deployed to assist the processor in the movement of the data to and from the memory core, the use of the DMA module would incur extra bus overhead, and may not be appropriate for certain real-time applications. Furthermore, employing a DMA module is also expensive, thereby increasing the overall cost of the network device.

SUMMARY OF THE INVENTION

In one embodiment, a network device is disclosed. For example, in one embodiment of the present invention, the device comprises a processor and a core memory having a receive buffer and a transmit buffer. The device comprises a bus coupled to the processor and the core memory. The device comprises at least one co-processor coupled to the core memory via a direct link, wherein the at least one co-processor is capable of accessing at least one of: the receive buffer, or the transmit buffer, without assistance from the processor.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
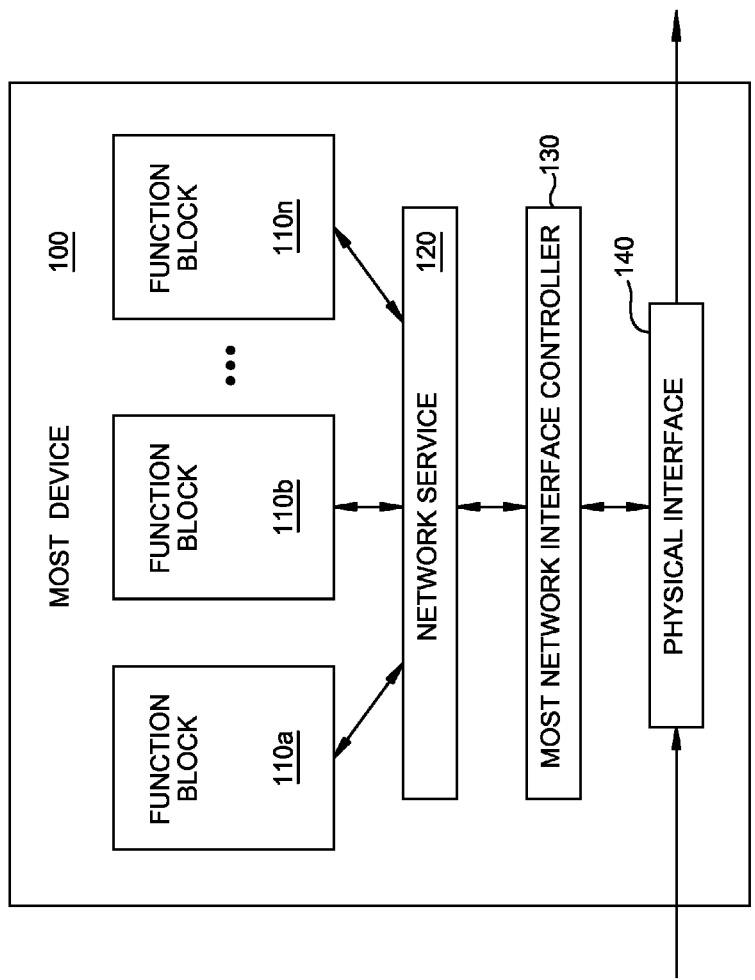
FIG. 1 illustrates an illustrative overview of a network device, e.g., a Media Oriented Systems Transport device.

FIG. 1 illustrates an illustrative overview of a network device 100, e.g., a Media Oriented Systems Transport (MOST) device. In one embodiment, the network device 100 at the application level may comprise one or more components called function blocks 110a-n. For example, the function blocks may comprise, a tuner, an amplifier, a CD player, a DVD player and the like. Each network device 100 may comprise one or more function blocks, e.g., one network device may implement a tuner and an amplifier, whereas another network device may implement a DVD player. In one embodiment, the function blocks broadly represent applications.

The network device 100 may also include a network service component 120 which forms an intermediate layer providing one or more routines or interfaces for assisting the interactions between the function blocks and the Network Interface Controller (NIC) 130. The Network Interface Controller 130 facilitates the connection of the network device 100 to a network, e.g., a MOST network, via a physical interface 140. In one embodiment, the physical layer of the network comprises a ring network. However, it should be noted that the present invention is not limited to a ring network and that the present invention can be adapted to other types of physical networks.

In one embodiment, various applications within the network device 100 may need to access data and communicate with applications within the network device 100 and/or with other applications within another network device 100. For example, a memory core having one or more buffers (shown in FIG. 2 below) within the network device 100 may contain data that can be accessed by one or more applications. In one embodiment of the present invention, access to the memory core by one or more applications can be implemented via one or more direct links instead of using a shared bus.

Figure 2:
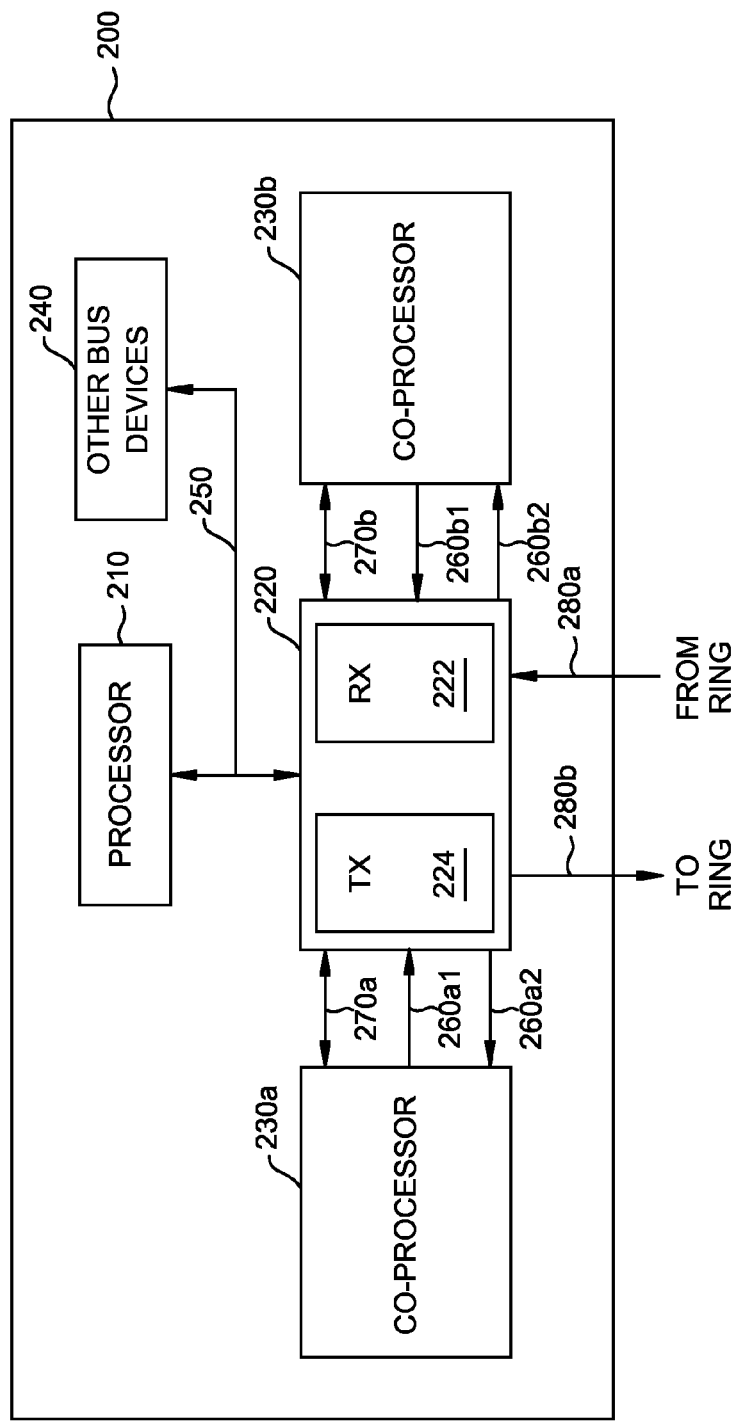
FIG. 2 illustrates an illustrative overview of a network device having a memory core of the present invention.

FIG. 2 illustrates an illustrative overview of a network device 200 (e.g., a MOST device) having a memory core of the present invention. In one embodiment, network device 200 comprises a processor 210, e.g., an embedded processor, a memory core having one or more buffers 222, 224, one or more co-processors 230a-b, and one or more other bus devices 240. In operation, the processor 210 serves to support various network services and various user applications. In supporting various network services and various user applications, the processor 210 may interact with one or more bus devices 240, e.g., speakers, displays, and the like. In one embodiment, the communication is carried via a shared bus 250. For example, the processor 210 may be tasked with processing audio data and video data, e.g., from a DVD player, to produce the proper audio outputs to a speaker and the proper video output to a display.

However, processing audio and video data can be computationally intensive. For example, the audio and video data from a DVD source can be encoded and/or encrypted, thereby requiring the processor to perform a decoding and/or decryption function. In fact, there may be numerous other audio processing functions and image processing functions that may be required, e.g., changing an image resolution, transcoding the audio and/or video data, format conversion, audio filtering and the like.

Given the complexity of these computationally intensive functions, one or more co-processors 230*a-b* can be employed to assist the processor 210. It should be noted that although only two co-processors are illustrated, any number of co-processors can be employed in the present invention.

In one embodiment, data necessary to support the various network services and various user applications are stored in a memory core 220 having one or more buffers 222 and 224. For example, the memory core 220 may employ a receive buffer 222 and a transmit buffer 224. Broadly, the receive buffer 222 is used to store data received by the network device 200, whereas the transmit buffer 224 is used to store data to be transmitted from the network device 200.

In one embodiment, data stored in the memory core 220 can be accessed by the processor 210, the co-processors 230*a-b*, and the other bus devices 240. However, the processor 210 and the other bus devices 240 must access the data stored in the memory core 220 via the bus 250. In contrast, the co-processors 230*a-b* access the data stored in the memory core 220 via direct access links 260*a1-a2*-260*b1-b2*. This approach provides a significant improvement in allowing the co-processors to quickly and directly access the stored data without the assistance of the processor 210. Namely, the co-processors 230*a-b* do not need to send data requests to be serviced by the processor 210 or a DMA module. Similarly, the co-processors 230*a-b* do not need to gain access to the shared bus 250 in accessing the stored data in the memory core 220.

To illustrate, if encrypted video data arrives on path 280*a* (broadly a network interface) and is stored in the receive buffer 222, then the co-processor 230*b* that is tasked with performing the decryption function may access the stored encrypted video data directly via the direct access link 260*b2*. When the encrypted video data is decrypted by the co-processor 230*b*, the decrypted video data is again returned to the receive buffer 222 directly via the direct access link 260*b1*. This ability to access the needed data without the assistance of the processor 210 and the use of the shared bus 250 significantly improves the speed with which the network device 200 is able to process data that is shared among the network devices within the network. For example, the network device 200 is able to better process data associated with real-time applications.

In one embodiment, status signals 270*a-b* are provided to the co-processors 230*a-b*, e.g., at least one status signal for each co-processor. The status signal provides a method for the memory core to inform the co-processors 230*a-b* as to when it is safe to access the buffers within the memory core. As discussed above, since the processor 210 has the ability to access the data in the memory core 220, the status signal provides an efficient method for the processor and co-processors to coordinate their access of data in the memory core 220. A detailed description of the status signal will be provided below.

Figure 3:
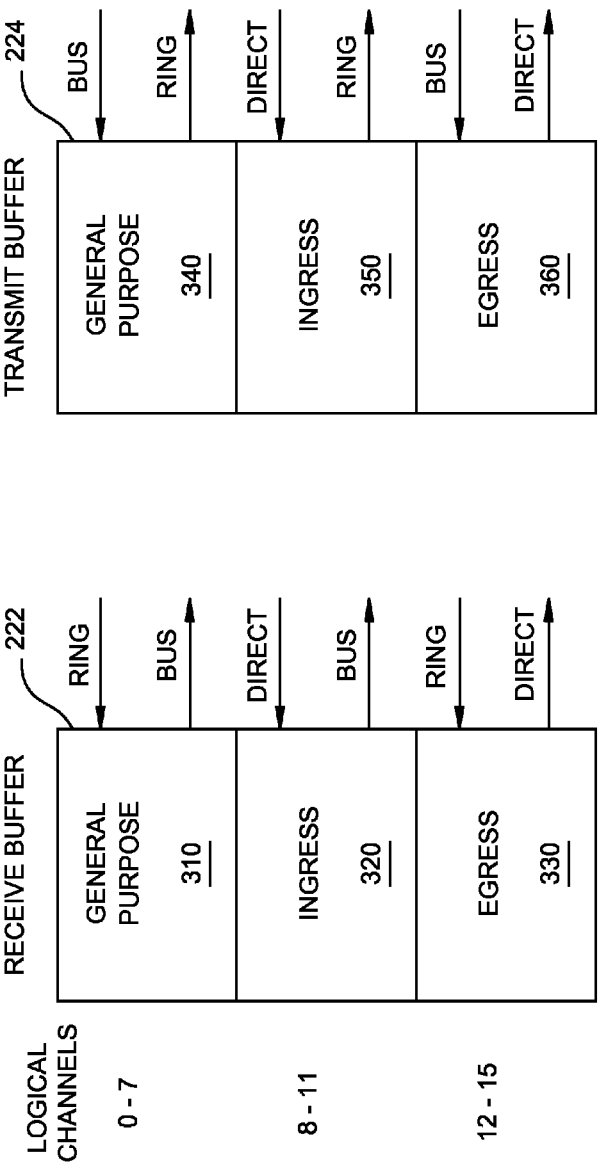
FIG. 3 illustrates an illustrative overview of a receive buffer and a transmit buffer within a memory core of the present invention.

FIG. 3 illustrates an illustrative overview of a receive buffer 222 and a transmit buffer 224 within a memory core of the present invention. In one embodiment, each of the receive buffer 222 and the transmit buffer 224 is divided into a plurality of portions that are accessible by a plurality of different logical channels. Each of the portions may have a different type of buffer access. For example, the receive buffer 222 is divided into a general purpose portion 310 (read and write access), an ingress portion 320 (write to the buffer) and an egress portion 330 (read from the buffer). In one embodiment, a plurality of logical channels are mapped to the receive buffer 222, e.g., channels 0-7 for the general purpose portion, channels 8-11 for the ingress portion, and channels 12-15 for the egress portion. For example, the general purpose portion may receive data from the ring and the data is extracted and forwarded to the bus. Similarly, the ingress portion may receive data from the direct link and the data is extracted and forwarded to the bus, whereas the egress portion may receive data from the ring and the data is extracted and forwarded to the direct link.

Similarly, the transmit buffer 224 is also divided into a general purpose portion 340 (read and write access), an ingress portion 350 (write to the buffer) and an egress portion 360 (read from the buffer). In one embodiment, a plurality of logical channels are mapped to the receive buffer 224, e.g., channels 0-7 for the general purpose portion, channels 8-11 for the ingress portion, and channels 12-15 for the egress portion. For example, the general purpose portion may receive data from the bus and the data is extracted and forwarded to the ring. Similarly, the ingress portion may receive data from the direct link and the data is extracted and forwarded to the ring, whereas the egress portion may receive data from the bus and the data is extracted and forwarded to the direct link.

Although FIG. 3 illustrates the mapping of 16 logical channels for each buffer, the present invention is not so limited. Namely, any number of logical channels can be mapped to the buffer depending on the requirements of a particular implementation and/or the overall size of the buffer. Furthermore, although not shown, both the ingress and egress portions of both buffers are controllable by the processor 210. For example, the processor 210 has the ability to send various control signals, such as a reset signal, a flush signal, a disable signal, or an enable signal, to both the ingress and egress portions of both buffers.

Thus, FIG. 3 illustrates that various portions of the memory core 220 can be accessed directly via direct links by the co-processors 230*a-b*. By dedicating portions of the memory core to be directly accessible by the co-processors, the present invention minimizes the overhead of the processor 210 and resources in general. Furthermore, the present invention allows data to be processed in an efficient manner that enables real time applications to be performed by the network device. As such, each of the co-processors 230*a-b* can be designed to perform one or more dedicated functions, thereby reducing the processing load of the processor. These functions include but are not limited to encryption, decryption, encoding, decoding, transcoding, format conversion, filtering, masking, compression, decompression, noise-cancellation, equalization, or any other functions associated with image processing and/or audio processing. As such, each co-processor can be perceived as an embedded core having one or more dedicated functions.

Figure 4:
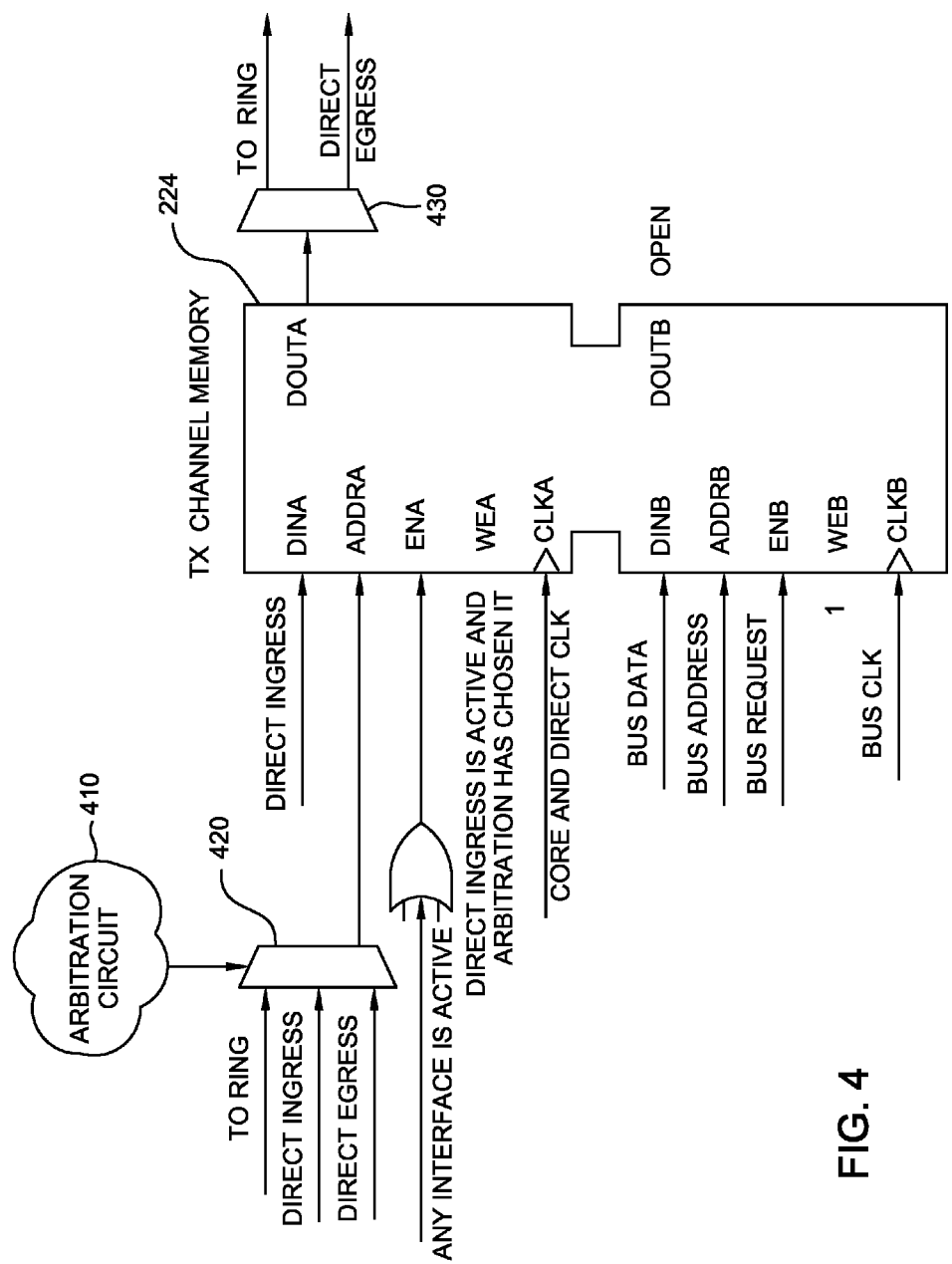
FIG. 4 illustrates an illustrative implementation of the transmit buffer memory of the present invention.

FIG. 4 illustrates an illustrative implementation of the transmit buffer memory 224 of the present invention. As shown, an arbitration logic 410 is implemented to control a 3:1 multiplexer 420 for providing access to the transmit buffer. An additional 1:2 demultiplexer 430 is employed to direct data to either the ring interface (broadly a network interface) or to the direct egress interface.

Figure 5:
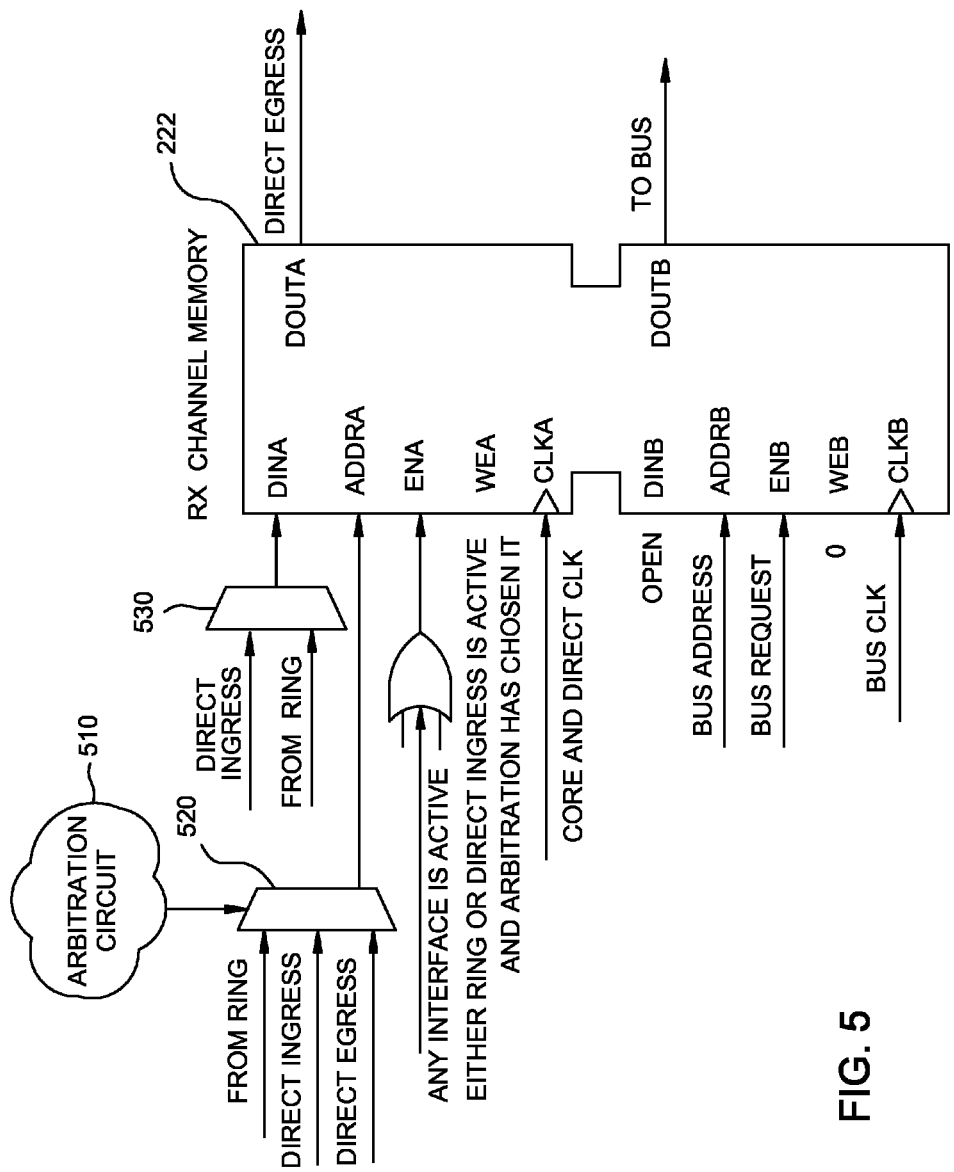
FIG. 5 illustrates an illustrative implementation of the receive buffer memory of the present invention.

FIG. 5 illustrates an illustrative implementation of the receive buffer memory 222 of the present invention. As shown, an arbitration logic 510 is implemented to control a 3:1 multiplexer 520 for providing access to the receive buffer. An additional 2:1 multiplexer 530 is employed to receive data from either the ring interface or from the direct ingress interface. As shown in FIGS. 4 and 5, the added circuitry or circuit resources are relatively minimal to provide the direct local links to the co-processors.

It should be noted that although FIG. 2 illustrates data entering the memory core from the ring, it does not necessarily require that the data be used locally by an application implemented by the processor, i.e., any other local processing unit can also be a consumer or producer of the data. For example, it could be piped directly to a speaker if no other application processing were required. In another example, data entering the receive buffer 222 from the ring interface may be processed by the co-processor 230b. Once the data has been processed, the co-processor 230b will return the processed data to the memory core. However, instead of the processed data being used by the processor, the processed data in the memory core will be transmitted out of the memory core and back to the network via the ring interface 280b. For example, the processed data from the co-processor 230b will be returned to the transmit buffer instead of the receive buffer. In this fashion, a network device may access the function performed by a co-processor of another network device. This ability to share functions performed by co-processors of different network devices provides flexibility and reduces cost of the overall network.

Figure 6:
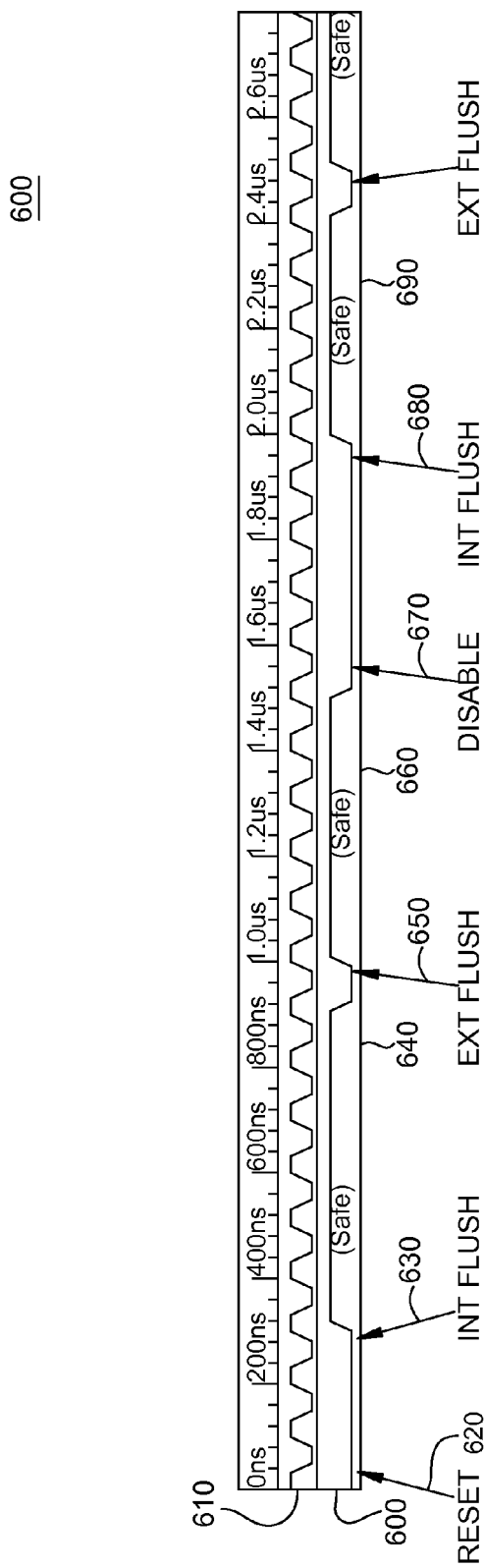
FIG. 6 illustrates an illustrative status signal of the present invention.

FIG. 6 illustrates an illustrative status signal 600 of the present invention. As discussed above, in one embodiment, status signals 270a-b are provided to the co-processors 230a-b, e.g., at least one status signal for each co-processor, via at least one direct link. The status signal provides a method for the memory core to inform the co-processors 230a-b as to when it is safe to access the buffers within the memory core, i.e., when the buffer is available for read or write operations. Effectively, this status signal implementation can be perceived as an arbitration circuit.

To illustrate, the status signal 600 is illustrated in conjunction with a clock signal 610. FIG. 6 illustrates a reset event 620 followed by an internal flush event 630. As illustrated, the status signal 600 is held in a low state to indicate that the buffer is not available to the co-processor via the local direct link. However, once the internal flush event 630 is concluded, the status signal 600 is changed to a high state 640 to indicate that the buffer is now available to the co-processor via the local direct link. Subsequently, an external flush event 650 occurs and the status signal 600 is again held in a low state to indicate that the buffer is not available to the co-processor via the local direct link. Once the external flush event 650 is concluded, the status signal 600 is changed to a high state 660 to indicate that the buffer is now available to the co-processor via the local direct link. Subsequently, a disable event 670 occurs followed by an internal flush event 680 and the status signal 600 is again held in a low state to indicate that the buffer is not available to the co-processor via the local direct link. Once the disable event 670 and the internal flush event 680 are concluded, the status signal 600 is changed to a high state 690 to indicate that the buffer is now available to the co-processor via the local direct link and so on.

As illustrated in FIG. 6, the embedded processor holds domain over enabling and flushing of the unified buffer. Without coordination or arbitration with the embedded processor, the co-processor cannot reliably access the buffer. However, by monitoring the status signal 600 generated by the buffer, a co-processor will be able to quickly determine whether it is safe to access the buffer for a read or write operation. Again, this implementation only requires a minimal amount of resources.

Additionally, in one embodiment, the status signal is provided on a direct access channel basis. Namely, each channel that can be accessed will receive a status signal.

Furthermore, as shown in FIG. 6, the co-processor is also able to determine what type of event is causing the buffer to be unavailable. In one embodiment, each of the event (e.g., reset, internal flush, external flush, disable, enable) has a different time duration such that the co-processor will be able to determine the type of event by monitoring the elapsed clock cycles.

Figure 7:
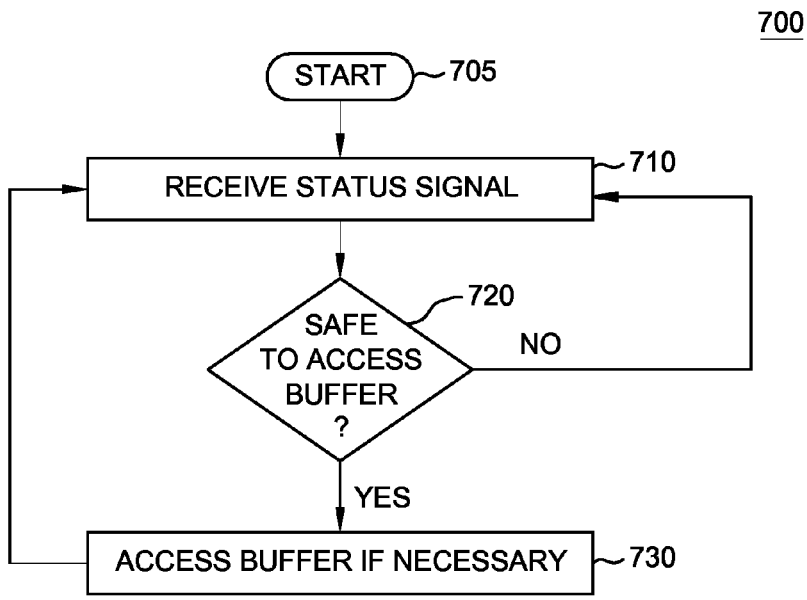
FIG. 7 illustrates a flow chart of a method for monitoring a status signal in accordance with one or more embodiments of the present invention.

FIG. 7 illustrates a flow chart of a method 700 for monitoring a status signal in accordance with one or more embodiments of the present invention. For example, method 700 can be employed by a co-processor as discussed above.

Method 700 starts in step 705 and proceeds to step 710. In step 710, a status signal is received from a buffer (e.g., a receive buffer or a transmit buffer).

In step 720, method 700 determines whether it is safe to access the buffer, e.g., determining whether the status signal is high or low. If the query is affirmatively answered, then the method proceeds to step 730. If the query is negatively answered, then the method proceeds back to step 710 and continues to monitor the status signal.

In step 730, the method 700 may access the buffer for a read or write operation. Namely, the co-processor may access the buffer via a local direct link. Method 700 then returns to step 710.

Figure 8:
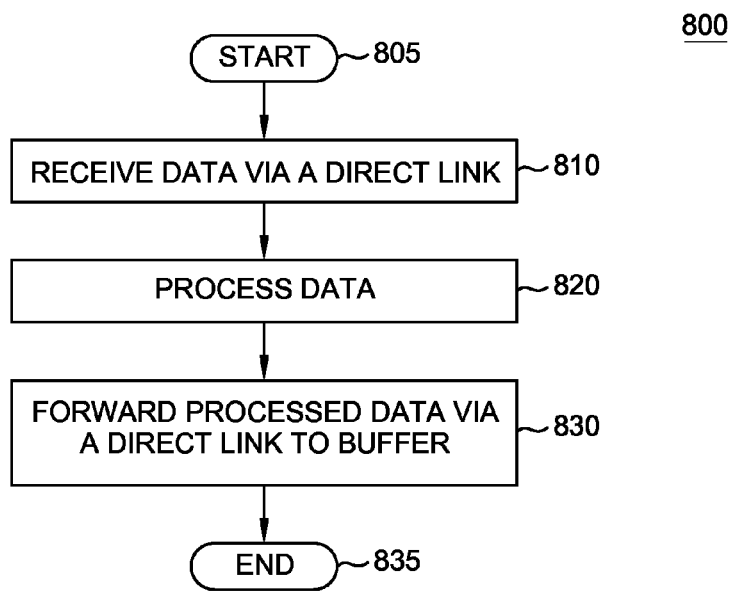
FIG. 8 illustrates a flow chart of a method for accessing data from a unified buffer in accordance with one or more embodiments of the present invention.

FIG. 8 illustrates a flow chart of a method 800 for accessing data stored in a unified buffer in accordance with one or more embodiments of the present invention. For example, method 800 can be employed by a co-processor as discussed above.

Method 800 starts in step 805 and proceeds to step 810. In step 810, method 800 receives data from a unified buffer via a local direct link. For example, the co-processor reads data from the unified buffer via a local direct link.

In step 820, method 800 processes the retrieved data. For the example, the co-processor performs one of more functions on the retrieved data, e.g., an encryption function, a decryption function, an encoding function, a decoding function, a transcoding function, a format conversion function, a filtering function, a masking function, and the like. Namely, one or more image and/or audio processing functions can be employed.

In step 830, method 800 forwards processed data back to the unified buffer via a local direct link. For example, the co-processor writes data to the unified buffer via a local direct link. Method then ends in step 835.

It should be noted that although not specifically specified, one or more steps of methods 700 and 800 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 7 and 8 that recite a determining operation or involve a decision, do not necessarily require that both branches of the determining operation be practiced. In other words, one of the branches of the determining operation can be deemed as an optional step.

It should be noted that the processor and co-processors of FIG. 2 are suitable for use in performing some or all of the functions described herein. Furthermore, it should be noted that embodiments of the present invention can be implemented in software and/or in a combination of software and hardware, e.g., using application specific integrated circuits (ASIC), a general purpose computer or any other hardware equivalents such as microprocessors. In one embodiment, the present module or process for monitoring a status signal and/or for accessing data stored in a unified buffer can be loaded into memory and executed by processor to implement the functions as discussed above. As such, the present module or process for monitoring a status signal and/or for accessing data stored in a unified buffer (including associated data structures) of embodiments of the present invention can be stored on a computer readable medium or carrier, e.g., RAM memory, magnetic or optical drive or diskette and the like.

Furthermore, in one embodiment, one or more aspects of the present invention relate generally to a programmable logic device (PLD). A programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, one or more modules of the network device as shown in FIG. 2 can be implemented on a PLD. For example, the processor 210, co-processors 230*a*-*b*, and the memory core 220 can be implemented on a PLD.

Furthermore, in one embodiment, one or more aspects of the present invention relate generally to an integrated circuit having a programmable portion. For example, the integrated circuit may comprise a processor with a programmable portion. As such, one or more modules of the network device as shown in FIG. 2 can be implemented on an integrated circuit having a programmable portion. For example, the co-processors 230*a*-*b*, and the memory core 220 can be implemented on a programmable portion of the integrated circuit.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A device, comprising:
 a processor;
 a core memory having a receive buffer and a transmit buffer;
 a bus coupled to the processor and the core memory;
 at least one co-processor separate from the core memory and coupled to the core memory via a direct link that is accessible only by the at least one co-processor and by the core memory, wherein the at least one co-processor accesses at least one of: the receive buffer of the core memory, or the transmit buffer of the core memory, without assistance from the processor; and
 at least one network interface providing a direct path between the core memory and a network;
 wherein:
 the receive buffer has a plurality of portions and the transmit buffer has a plurality of portions;
 a first one of the portions of the receive buffer and a first one of the portions of the transmit buffer are dedicated to network and bus access;
 a second one of the portions of the receive buffer and a second one of the portions of the transmit buffer are dedicated to co-processor and bus access; and
 a third one of the portions of the receive buffer and a third one of the portions of the transmit buffer are dedicated to network and co-processor access.

2. The device of claim 1, wherein the device comprises a Media Oriented Systems Transport (MOST) device.

3. The device of claim 1, wherein the at least one network interface directly couples the core memory with another device in the network.

4. The device of claim 1, wherein the network is a ring network.

5. The device of claim 1, wherein the at least one co-processor performs at least one of: an encryption function, a decryption function, an encoding function, a decoding function, a transcoding function, a format conversion function, a filtering function, a masking function, a compression function, a decompression function, a noise-cancellation function, or an equalization function.

6. The device of claim 1, wherein a plurality of logical channels is mapped to the plurality of portions.

7. The device of claim 1, wherein the core memory provides a status signal to the at least one co-processor, wherein the status signal indicates whether the core memory is available for access via the direct link.

8. The device of claim 1, wherein the device comprises a programmable logic device (PLD).

9. The device of claim 1, wherein the device comprises an integrated circuit having a programmable portion.

10. A method for accessing data stored in a core memory having a receive buffer and a transmit buffer, comprising:
 dividing the receive buffer into a plurality of portions and the transmit buffer into a plurality of portions;
 dedicating access to a first one of the portions of the receive buffer and a first one of the portions of the transmit buffer to at least one network interface and to a bus;
 dedicating access to a second one of the portions of the receive buffer and a second one of the portions of the transmit buffer to at least one co-processor and the bus;
 dedicating access to a third one of the portions of the receive buffer and a third one of the portions of the transmit buffer to the at least one network interface and the at least one co-processor;
 reading data from at least one of: the receive buffer of the core memory or the transmit buffer of the core memory, by the at least one co-processor via a direct link, wherein the at least one co-processor is separate from the core memory, and wherein the core memory is coupled to the at least one network interface that provides a direct path between the core memory and a network;
 processing the data by the at least one co-processor to produce processed data; and
 writing the processed data to at least one of: the receive buffer of the core memory or the transmit buffer of the core memory, by the at least one co-processor via the direct link that is accessible only by the at least one co-processor and by the core memory, wherein the at least one co-processor performs the reading and the writing without assistance from a processor that is coupled to the core memory via the bus.

11. The method of claim 10, wherein the core memory, the at least one co-processor, and the processor are deployed in a Media Oriented Systems Transport (MOST) device.

12. The method of claim 11, wherein the MOST device comprises a programmable logic device (PLD).

13. The method of claim 10, wherein the at least one co-processor processes the data in accordance with at least one of: an encryption function, a decryption function, an encoding function, a decoding function, a transcoding function, a format conversion function, a filtering function, a masking function, a compression function, a decompression function, a noise-cancellation function, or an equalization function.

14. The method of claim 10, wherein the core memory is divided into a plurality of portions, wherein at least one portion of the plurality of portions is an ingress portion, and wherein at least one portion of the plurality of portions is an egress portion.

15. The method of claim 14, wherein a plurality of logical channels is mapped to the plurality of portions.

16. The method of claim 10, further comprising:
providing a status signal by the core memory to the at least one co-processor, wherein the status signal indicates whether the core memory is available for access via the direct link.

17. A non-transitory computer-readable medium having stored thereon a plurality of instructions, the plurality of instructions including instructions which, when executed by a processor, cause the processor to perform a method for accessing data stored in a core memory having a receive buffer and a transmit buffer, comprising:
dividing the receive buffer into a plurality of portions and the transmit buffer into a plurality of portions;
dedicating access to a first one of the portions of the receive buffer and a first one of the portions of the transmit buffer to at least one network interface and to a bus;
dedicating access to a second one of the portions of the receive buffer and a second one of the portions of the transmit buffer to at least one co-processor and the bus;
dedicating access to a third one of the portions of the receive buffer and a third one of the portions of the transmit buffer to the at least one network interface and the at least one co-processor;
reading data from at least one of: the receive buffer of the core memory or the transmit buffer of the core memory, by the at least one co-processor via a direct link, wherein the at least one co-processor is separate from the core memory, and wherein the core memory is coupled to the at least one network interface that provides a direct path between the core memory and a network;
processing the data by the at least one co-processor to produce processed data; and
writing the processed data to at least one of: the receive buffer of the core memory or the transmit buffer of the core memory, by the at least one co-processor via the direct link that is accessible only by the at least one co-processor and by the core memory, wherein the at least one co-processor performs the reading and the writing without assistance from a processor that is coupled to the core memory via the bus.

18. A method for accessing data stored in a core memory having a receive buffer and a transmit buffer, comprising:
dividing the receive buffer into a plurality of portions and the transmit buffer into a plurality of portions;
dedicating access to a first one of the portions of the receive buffer and a first one of the portions of the transmit buffer to at least one network interface and to a bus;
dedicating access to a second one of the portions of the receive buffer and a second one of the portions of the transmit buffer to a co-processor and the bus;
dedicating access to a third one of the portions of the receive buffer and a third one of the portions of the transmit buffer to the at least one network interface and the co-processor;
receiving a status signal by the co-processor from the core memory via a direct link that is accessible only by the co-processor and by the core memory, wherein the co-processor is separate from the core memory, and wherein the core memory is coupled to at least one network interface that provides a direct path between the core memory and a network;
determining whether the core memory is available for access; and
accessing the core memory directly by the co-processor if the core memory is deemed to be available for access.

* * * * *